United States Patent [19]

Suzuki

[11] Patent Number: 4,543,515
[45] Date of Patent: Sep. 24, 1985

[54] MOTOR CONTROLLING SWITCH DEVICE

[75] Inventor: Masaru Suzuki, Aichi, Japan

[73] Assignee: Kabushiki Kaisha Tokai Rika Denki Seisakusho, Aichi, Japan

[21] Appl. No.: 622,254

[22] Filed: Jun. 19, 1984

[30] Foreign Application Priority Data

Jun. 20, 1983 [JP] Japan ............................. 58-111716

[51] Int. Cl.[4] .................... H02P 1/22; H01H 83/22
[52] U.S. Cl. ................................ 318/293; 318/280; 200/12; 200/339; 335/268
[58] Field of Search ................ 318/280, 293; 200/12, 200/339; 335/268, 11, 15, 18, 37, 68, 76, 106, 155; 361/187, 194, 206, 210; 307/117

[56] References Cited

U.S. PATENT DOCUMENTS

| | | | |
|---|---|---|---|
| 1,833,349 | 11/1931 | Beetem | 307/117 X |
| 2,564,246 | 8/1951 | Bourne | 335/268 X |
| 3,184,651 | 5/1965 | Albosta | 335/268 X |
| 4,188,623 | 2/1980 | Suzuki et al. | 307/117 X |
| 4,303,810 | 12/1981 | Oard | 318/280 X |
| 4,459,522 | 6/1984 | Huber | 318/293 |

Primary Examiner—William M. Shoop, Jr.
Assistant Examiner—Bentsu Ro
Attorney, Agent, or Firm—Finnegan, Henderson, Farabow, Garrett & Dunner

[57] ABSTRACT

A motor controlling switch device in which, when the motor is stopped in locking manner, an operating member for operating the switch and for applying current to the motor is returned from an operating position to an original position. The magnetic force of a voltage coil holding the operating member at the operating position is cancelled out by a magnetic force of a current coil which is induced therein by the locking current of the motor.

8 Claims, 18 Drawing Figures

MOTOR CONTROLLING SWITCH DEVICE

FIELD OF THE INVENTION

This invention relates to a switch device for controlling an electric motor. More specifically this invention relates to a switch device which can be used in a power window regulator, a power sun roof, a power curtain or the like of an automobile.

BACKGROUND OF THE INVENTION

A power window regulator of an automobile is commonly equipped with a switch device which is designed with a knob provided on a casing in such a manner that a restoring force is applied to the knob at all times to return it to its original position. The knob is turned from the original position to a first operating position by pushing it. The knob is turned from the first operating position to a second operating position by pushing it again. That is, the knob is operated in two steps.

A motor operating switch is provided which is turned on when the know takes the first or second operating position, to complete the forward or reverse rotation circuit of the motor (or vice versa, depending upon the interconnetion between the switch and the motor), and to move the window in one or the other direction, depending again on the particular mechanical interconnection between the motor and window apparatus. In addition, a holding switch is provided which, when the knob is moved to the second operating position, is turned on to apply current to an electromagnetic solenoid adapted to attract and hold the knob at the second operating position. Therefore, when the knob is kept in the first operating position, the window is continuously moved.

When the knob is set at the second operating position, the window is moved until the window is fully opened or fully closed even if the knob is released. When the window has been fully opened or closed, the driving motor is stopped and locked. In order to overcome this difficulty, a detecting device has been employed to determine when the window has reached the fully open or fully closed position.

The detecting device normally includes a contactor to which direct current is applied and which is brought into contact with a sector wheel. The sector wheel is coupled to a lever to move the window directly and to engage a pinion driven by the motor. A detecting circuit detects spike-shaped noise induced in the contactor as the contact resistance changes with movement of the sector wheel. A transistor connected in series to the above-described electromagnetic solenoid is turned on as long as the detecting circuit detects the noise, so that when the detecting circuit detects no noise, i.e., when the motor is stopped in a locking manner with the window fully opened or closed, the transistor is turned off to stop current flow to the electromagnetic solenoid. The knob is then returned to its original position to deenergize the motor.

This construction is disadvantageous in that the detecting device is intricate and causes the power window regulator switch device to be large in size and high in manufacturing cost. Moreover, the switch device requires a relatively large installation space.

OBJECTS AND SUMMARY OF THE INVENTION

In view of the foregoing, an object of this invention is a motor controlling switch device in which, when the motor is stopped in locking manner, an operating member adapted to operate a switch for applying current to the motor is returned from its operating position to its original position.

Another object of the present invention is a motor controlling switch including a switch member which when moved from an original position to an operating position enables the continuous operation of the motor and which is automatically restored to the original position responsive to a predetermined condition of the motor.

Still another object of the present invention is a motor controlling switch which is of simple construction, is inexpensive, and can be installed in a small space.

Yet another object of the present invention is an improved motor controlling switch for controlling the operation of power windows in a motor vehicle.

These and other objects are achieved by a switch device for controlling an electric motor comprising an operating member for taking an original position and an operating position for enabling a supply voltage to be applied to the motor, means for applying a restoring force to the operating member when the operating member is in the operating position to urge the operating member to move from the operating position to the original position, and an electromagnetic device for receiving the supply voltage and for producing a first magnetic force stronger than the restoring force to attract and to hold the operating member in the operating position, the electromagnetic device also for receiving current flowing in the motor and for producing a second magnetic force equal in strength to the first magnetic force in response to a predetermined condition of the motor, the second magnetic force cancelling the first magnetic force to enable the restoring force to restore the operating member to the original position responsive to the occurrence of the predetermined condition of the motor.

BRIEF DESCRIPTION OF THE DRAWINGS

These and other object, features, and advantages of the invention, as well as the invention itself, will become more apparent to those skilled in the art when considered in the light of the accompanying drawings, wherein.

DETAILED DESCRIPTION OF THE PREFERRED EMBODIMENTS

A first embodiment of the present invention, which is a power window regulator switch unit, will be described with reference to FIGS. 1 through 6.

First, the entire arrangement of the switch unit will be described with reference to FIGS. 1 through 5. In these figures, reference numeral 1 designates a substantially rectangular, plastic casing in the top wall of which a substantially rectangular insertion opening 2 is formed. A protrusion 4 having a supporting recess 3 is extended from the central portion of the bottom wall of the casing 1. The supporting recess 3 has surfaces 3a and 3b which are sloped upward from the center like the character "V". The sloped surfaces 3a and 3b have steps 3c and 3d, respectively, at approximately the middle thereof.

A substantially rectangular plastic knob 5 has a central part and right-hand and left-hand parts which are sloped upward from the central part like the character "V". Depressing protrusions 6 and 7 extend downward from the ends of the right-hand and left-hand parts, respectively. A cylinder 8 extends downward from the central part.

The knob 5 is pivotally mounted on a pin 9 extending between the upper portions of the front and rear walls of the casing 1 in such a manner that the knob is in the insertion opening 2.

A depressing piece 11 and a compression coil spring 10 are fitted in the cylinder 8 in such a manner that the compression coil spring 10 pushes the depressing piece 11 against the bottom of the supporting recess 3 so that the knob 5 is maintained at its original position. At the original position, the right-hand and left-hand parts of the knob 5 protrude above the insertion opening 2. The protrusion 4 with the supporting recess 3, the cylinder 8, the compression coil spring 10 and the depressing piece 11 form a mechanism 32 for provising a restoring force (herinafter referred to as "a restoring mechanism 32", when applicable).

A first switch 12 is provided on the upper part of the right wall of the casing 1. The first switch 12 comprises a movable contact piece 13 made of a leaf spring, and a stationary contact piece 14 which is a provided below the movable contact piece 13. Normally the movable contact piece 13 is maintained apart from the stationary contact piece 14; that is, the first switch is a normally open switch. The depressing protrusion 6 of the knob 5 contacts the upper surface of the end portion of the movable contact piece 13 of the first switch 12.

Similarly, a second switch 15 is provided on the upper part of the left wall of the casing 1. The second switch comprises a movable contact piece 16 made of a leaf spring and a stationary contact piece 17 which is provided below the movable contact piece 16. Normally the movable contact piece 16 is maintained apart from the stationary contact piece 17; that is, the second switch is also normally open. The depressing protrusion 7 of the knob 5 contacts the upper surface of the end portion of the movable contact piece 16 of the second switch 15.

An electromagnetic device 18 is provided at the center of the bottom of the casing 1. The electromagnetic device 18 comprises a substantially E-shaped iron core 22 set horizontally and having right, left and central legs 19, 20 and 21, a bobbin 23 fixed to the central leg 21, a voltage coil 24 wound on the bobbin 23 in a predetermined direction and a current coil 25 wound on the voltage coil 24 in the opposite direction. An attracting piece, namely, an iron piece 26 is secured to the lower surface of the knob 5. The lowermost portion of the iron piece 26, i.e., the middle portion of the iron piece 26, is brought close to or into contact with the upper end face of the central leg 21, and the right and left end portions of the iron piece 26 are confronted with the upper end faces of the right and left legs 19 and 20, respectively.

Figure 6:
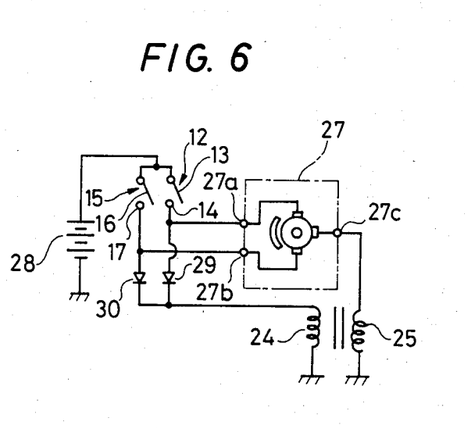
FIG. 6 is a circuit diagram of an electrical circuit employed in the switch of FIG. 1.

An electrical circuit will be described with reference to FIG. 6. In FIG. 6, reference numeral 27 designates a three-brush type motor for driving a power window regulator. The motor 27 has a forward rotation terminal 27a, a reverse rotation terminal 27b, and a common terminal 27c. For instance, when the motor is rotated in the forward direction, the window is moved downwardly to open the window, and when it is rotated in the reverse direction, it is moved upwardly to close the window. The circuit includes a DC source, or a battery 28. The battery 28 has a negative terminal which is grounded, and a positive terminal which is connected to the movable contact pieces 13 and 16 of the above-described switches 12 and 15. The stationary contact pieces 14 and 17 of the switches 12 and 15 are connected to the forward rotation terminal 27a and the reverse rotation terminal 27b of the motor 27, respectively. The stationary contact pieces 14 and 17 are further connected respectively through diodes 29 and 30 to one terminal of the aforementioned voltage coil 24 the other terminal of which is grounded. The common terminal 27c of the motor 27 is grounded through the current coil 25.

In the operation of the switch, when the right end portion of the knob 5 is depressed to turn the knob 5 in the direction of the arrow 31, the depressing piece 11 is caused to ride the sloped surface 3a of the supporting recess 3, while compressing the compression coil spring 10. Finally, the end of the depressing piece 11 abuts against the step 3c with resistance. Thus, the knob has been set at a first operating position for the opening operation.

Figure 4:
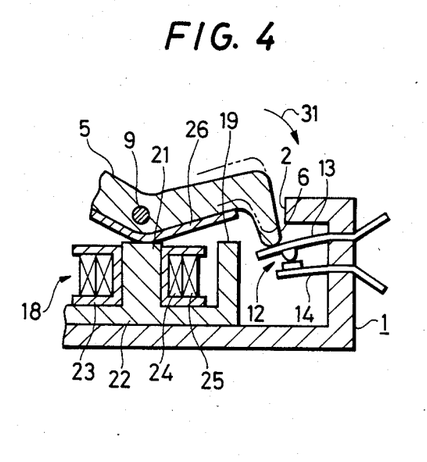

When the knob is at the first operating position, the right end portion of the iron piece 26 is still spaced apart from the upper end face of the right leg 19 of the iron core 22 (as shown in FIG. 4). Furthermore, when the knob 5 is set at the first operating position as described above, the depressing protrusion 6 depresses the movable contact piece 13 of the first switch 12 so that the contact of the movable contact piece 13 is brought into contact with the contact of the stationary contact piece 14. As a result, the voltage of the battery 28 is applied to the series circuit of the forward rotation terminal 27a and the common terminal 27c of the motor 27 and the current coil 25, so that the motor 27 is rotated in the forward direction to move the window downwardly and open the window.

When the first switch 12 is turned on as described above, the voltage of the battery 28 is applied through the diode 29 to the voltage coil 24 to create a magnetic force, while the current which flows in the motor 27 is supplied to the current coil 25.

Figure 1:
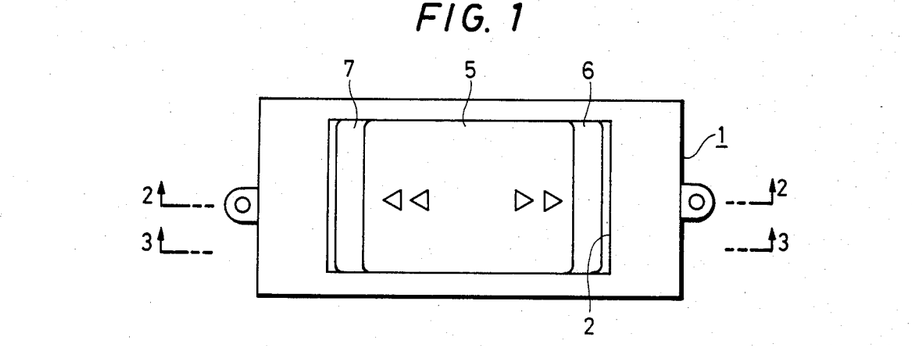
FIG. 1 is a plan view of a first embodiment of the switch of the present invention.
Figure 2:
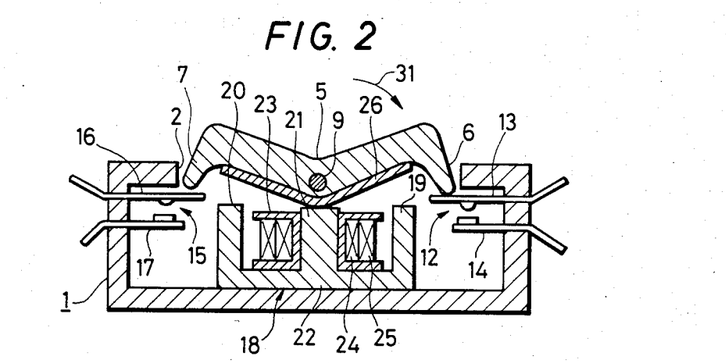
FIG. 2 is a cross-sectional view of the switch of FIG. 1 taken along the line 2—2.
Figure 3:
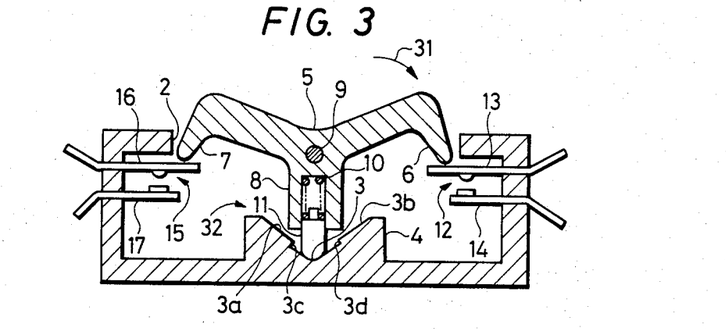
FIGS. 3, 4 and 5 are cross-sectional views of the switch of FIG. 1 taken along the line 3—3 and showing different operative states of the switch.

As a result, the current coil 25 induces a magnetic force to cancel the magnetic force of the voltage coil 24. The circuit is so designed that, in the steady operation of the motor 27, the amount of current flowing in the motor 27 is so small that the magnetic force of the voltage coil 24 is larger than that of the current coil 25. The magnetic force of the voltage coil 24 induces a force of attraction in the leg 19 of the iron core 22 to attract the right end portion of the iron piece 26. When the knob 5 is set at the first operating position, however, the right end portion of the iron piece 26 is positioned above the upper end face of the leg 19 and therefore the force of attraction does not act on the right end portion of the iron piece. When the knob 5 is released by removing the depressing force, the elastic force of the compression coil spring 10 and the inclination of the sloped surface 3a of the supporting recess 3 cause the depressing piece 11 to slide down the sloped surface so that the knob 5 is turned in the direction opposite to the direction of the arrow 31 to its original position as shown in FIG. 2 or 3. At the same time, the first switch is turned off. Thus, the window is stopped at the desired position, i.e., the window has been opened as desired.

Figure 5:
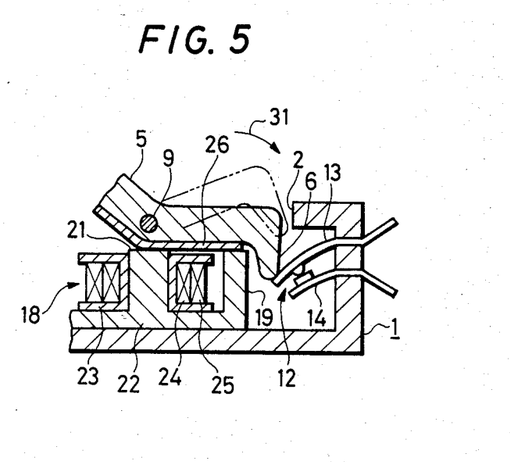

When the knob 5 is at the first operating position and is further depressed to turn in the direction of the arrow 31, the depressing piece 11 is moved over the step 3c of the sloped surface 3a. This sets the knob 5 at a second operating position for the opening operation as shown in FIG. 5. When the knob 5 is set at the second operating position, the right end portion of the iron piece 26 comes near the upper end face of the leg 19 of the iron core 22 or abuts against it.

In this case, the supply voltage is applied to the voltage coil 24 while the first switch 12 is maintained on. Accordingly, the force of attraction of the leg 19 of the iron core 22 acts on the right end portion of the iron piece 26, so that the knob 5 is held at the second operating position. Therefore, even if the depressing force on the knob 5 is eliminated, the first switch is maintained on so that the motor 27 continues to move the window downwardly. When the window reaches its lowest position, that is when the window is fully open, the motor 27 is stopped in locking manner, and a large locking current flows in the motor 27.

The locking current flows in the current coil 25 to increase the magnetic force of the current coil 25. The circuit is so designed that, in this case, the magnetic force of the voltage coil 24 is equal to that of the current coil 25. Therefore, the magnetic force of the voltage coil 24 is cancelled out by the magnetic force of the current coil 25, and the force of attraction of the leg 19 of the iron core 22 is eliminated. As a result, the depressing piece 11 is allowed to slide down the sloped surface 3a of the supporting recess 3 until the knob 5 returns its original position and the first switch 12 is turned off.

The case where the knob 5 is turned in the direction of the arrow 31 to move the window downwardly has been described. When the left end portion of the knob 5 is depressed to turn the knob 5 in the direction opposite to the direction of the arrow 31, the operations are carried out on the same operating principle. When the left end portion of the knob 5 is depressed, the depressing piece 11 is caused to ride the sloped surface 3b of the supporting recess 3 and abut against the step 3d. Thus, the knob 5 has been set at a first operating position for the closing operation. When the left end portion of the knob 5 is further depressed, the depressing piece 11 is caused to go over the step 3d of the sloped surface 3b. Thus, the knob 5 has been set at a second position for the closing operation. When the knob 5 is set at the first operating position and when it is set at the second operating position, the depressing protrusion 7 of the knob 5 moves the movable contact piece 16 downwardly to turn on the second switch 15.

As a result, the supply voltage is applied to the series circuit of the reverse rotation terminal 27b and the common terminal 27c of the motor 27 and the current coil 25, so that the motor is rotated in the opposite direction to move the window upwardly to close the window. When the second switch 15 is turned on, the supply voltage is applied through the diode 30 to the voltage coil 24. Therefore, when the knob 5 is set at the second operating position, the leg 20 of the iron core 22 attracts the left end portion of the iron piece 26 and the knob 5 is held at the second position.

If, in this case, the knob 5 is at the first operating position, releasing the knob 5 cause the knob 5 to return to its original position by means of the sloped surface 3b, the compression coil spring 10 and the depressing piece 11. On the other hand, even if the knob 5 is released when it is at the second operating position, the knob 5 is held at the second operating position and the second switch 15 is maintained on. When the window glass plate reaches its uppermost position to close the window fully, the motor 27 is stopped in a locking manner, and a locking current flows in the motor 27 and the current coil 25. As a result, the force of attraction of the leg 20 of the iron core 22 to the left end portion of the iron piece 26 is eliminated, so that the knob 5 is returned to its original position and the second switch 15 is turned off.

The current coil 25 is wound on the voltage coil 24, to which the supply voltage is applied through the first switch 12 or the second switch 15 in order to hold the knob 5 at the second operating position. In such a manner, the magnetic force of the voltage coil 24 is cancelled out by that of the current coil 25, and the current flowing in the motor 27 is applied to the current coil 25. Therefore, when the motor 27 is stopped in a locking manner with the window fully opened or closed, the magnetic force of the voltage coil 24 is cancelled out by that of the current coil 25. As a result, the knob 5 is automatically returned to its original position and the first switch 12 or the second switch 15 is turned off. Accordingly, the motor controlling switch device according to the present invention, unlike conventional switches, is simple in construction, small in size, low in manufacturing cost, and can be installed in a small space.

The steps 3c and 3d are formed in the sloped surfaces 3a and 3b of the supporting recess 3, respectively, which are adapted to give the restoring force to the knob 5 in association with the compression coil spring 10 and the depressing piece 11 so that the knob 5 is returned to the original position from the first or second operating position. Accordingly, the knob 5 is moved from the first operating position to the second operating position with resistance because of the presence of the steps 3c and 3d. Therefore, the difficulty that the knob is carelessly moved to the second operating position is eliminated.

Because the current preventing diodes 29 and 30 are provided in the circuit, the first switch 12 for rotating the motor 27 in the forward direction and the second switch 15 for rotating the motor 27 in the reverse direction can be used as switches for applying the supply voltage to the voltage coil 24. Accordingly, although the motor controlling switch device of the invention is so designed that the knob 5 is operated in two steps, i.e., it is set at the first and second operating positions, it is unnecessary to provide switches which are operated separately in the steps. As a result, the number of switches can be reduced and the circuitry is accordingly simple.

Figure 7:
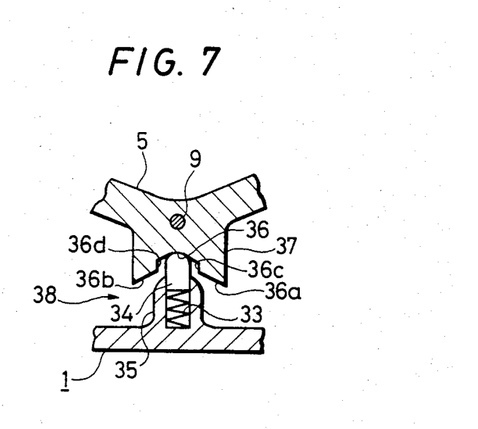
FIG. 7 is a sectional view of an alternate embodiment of a position restoring device for use in the switch of FIG. 1.
Figure 8:
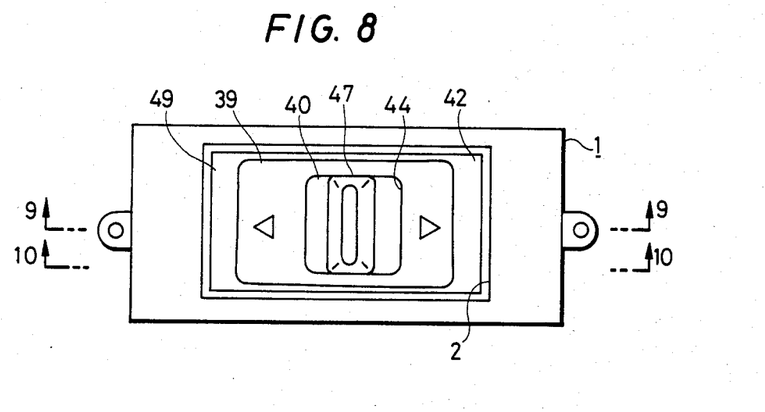
FIG. 8 is a plan view of a second embodiment of the switch of the present invention.

In the above-described embodiment, the protrusion 4 having the supporting recess 3 is formed on the case 1 and the cylinder 8 into which the depressing piece 11 is fitted through the compression coil spring 10 is formed on the knob 5, in order to form the restoring mechanism 32. In a second embodiment of the invention, as shown in FIG. 7, a cylinder 35 into which a depressing piece 34 is fitted through a compression coil spring 33 is formed on the casing 1, and a protrusion 37 with a supporting recess 36 depressed by the depressing piece 34 is formed on the knob 5, in order to form a restoring mechanism 38. In the second embodiment, the supporting recess 36 is formed in a substantially inverted V-shape having sloped surface 36a and 36b which have steps 36c and 36d, respectively, at approximately the middle of each.

A third embodiment of the invention is shown in FIGS. 8 through 12. In the third embodiment, the components which have been described with reference to the first embodiment are designated by the same reference numerals or characters, and only the different components will be described.

In FIGS. 8 through 11, reference numerals 39 and 40 designate a manual knob and automatic knob, respectively, which are employed instead of the knob 5 in the first embodiment. The knobs 39 and 40 are pivotally mounted on a pin 41 extending between the upper portions of the front and rear walls of the casing 1 in such a manner that the knob 39 is above the knob 40 and the knobs 39 and 40 may be turned independently of each other. The manual knob 39 is substantially the same in configuration as the knob 5 in the first embodiment. The manual knob 39 has depressing protrusions 42 and 43 respectively at the right and left ends, which are brought into contact with the upper surfaces of the end portions of the movable contact pieces 13 and 16, respectively. An insertion hole 44 is formed in the central portion of the manual knob 39.

The automatic knob 40 is also substantially similar in configuration to the knob 5 of the first embodiment. The automatic knob 40 has depressing protrusions 45 and 46 respectively at the right and left ends, which are brought into contact with the upper surfaces of the end portions of the movable contact pieces 13 and 16, respectively. The automatic knob 40 further has an operating lever 47 at the middle which is extended upwardly through the insertion hole 44.

The iron piece 26 is secured to the lower surface of the automatic knob 40. A restoring mechanism (not shown) which is substantially the same as the above-described restoring mechanism is provided between the knobs 39 and 40 and the bottom wall of the casing 1. However, the restoring mechanism has no steps corresponding to the above-described steps 3c and 3d in the first embodiment.

Figure 12:
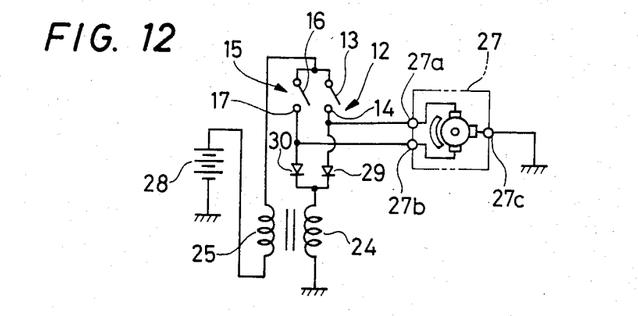
FIG. 12 is a circuit diagram of an electrical circuit employed in the switch of FIG. 8.
Figure 13:
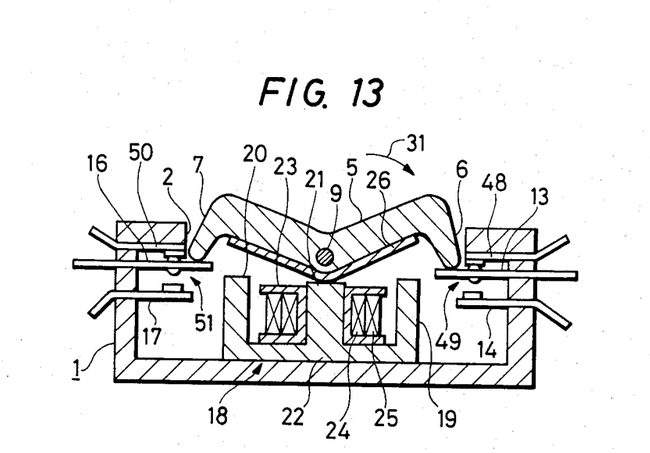
FIGS. 13-16 are sectional views of a third embodiment of the switch of the present invention showing the switch in different operative conditions.
Figure 14:
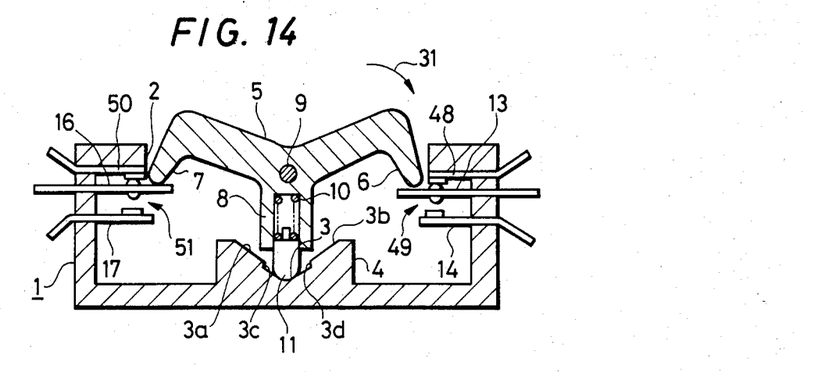

As shown in FIG. 12, one terminal of the current coil 25 is connected to the positive terminal of the battery 28, and the other terminal of the current coil 25 is connected to the movable contact pieces 13 and 16 of the switches 12 and 15. The common terminal 27c of the motor 27 is grounded directly.

Figure 9:
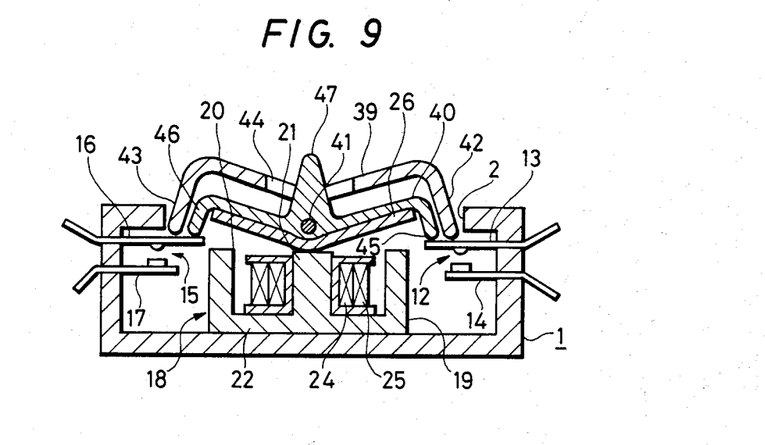
FIG. 9 is a cross-sectional view of the switch of FIG. 8 taken along the line 9—9.
Figure 10:
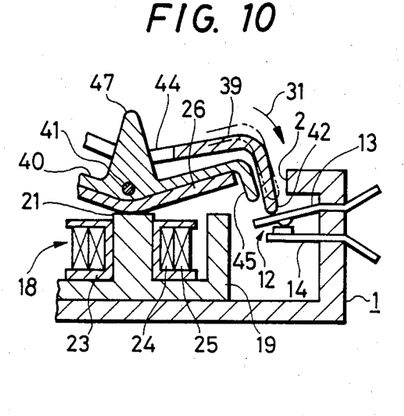
FIGS. 10 and 11 are cross-sectional views of the switch of FIG. 8 taken along the line 10—10 and showing different operative statio for the switch.

When the right end portion of the manual knob 39 is depressed to turn the latter 39 in the direction of the arrow 31 so that the manual knob 39 takes an operating position, the depressing protrusion 42 pushes the movable contact piece 13 downwardly to turn on the first switch 12 (as shown in FIG. 10). As a result, the supply voltage is applied across the forward rotation terminal 27a and the common terminal 27c of the motor 27 through the current coil 25, so that the motor 27 is rotated in the forward direction and the current flowing in the motor 27 is supplied to the current coil 25. When the first switch 12 is turned on, the supply voltage is applied to the voltage coil 24 through the current coil 25. However, in this case, as the automatic knob 40 has remained in its original position, the right end portion of the iron piece 26 is not attracted by the leg 19 of the iron core 22. When the manual knob 39 is released by removing the depressing force, the manual knob 39 is returned to its original position by the restoring mechanism (not shown) as shown in FIG. 9.

Figure 11:
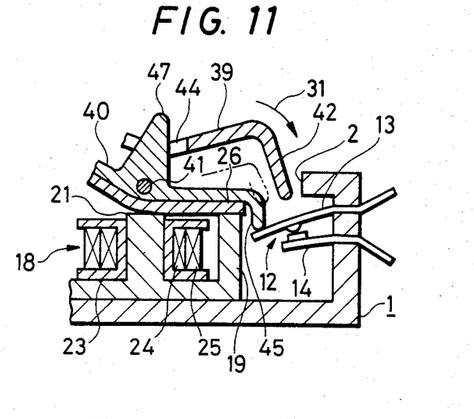

On the other hand, when the operating lever 47 is pushed to the right to turn the automatic knob 40 in the direction of the arrow 31, the depressing protrusion 45 turns on the first switch 12 while the right end portion of the iron piece 26 is caused to come near or to contact the upper end face of the leg 19 of the iron core 22, thus being atrracted thereto. Thus, the automatic knob 40 is held at its operating position (as shown in FIG. 11). In the case where the manual knob 39 or the automatic knob 40 is turned in the direction opposite to the direction of the arrow 31, the operations are substantially the same as those in the above-described case. In this case, the second switch 15 is turned on by the depressing protrusion 43 or 46, to rotate the motor in the reverse direction.

Accordingly, the third embodiment can obtain substantially the same effects as the first embodiment. The third embodiment is excellent in performance because of the employment of the manual knob and the automatic knob which are different.

A fourth embodiment of the invention is as shown in FIGS. 13 through 17. In the fourth embodiment, the components which have been previously described with reference to the first embodiment are designated by the same reference numerals or characters, and only the different components will be described.

As shown in FIGS. 13 through 16, a stationary contact piece 48 is arranged above the movable contact piece 13 in such a manner that its contact is in contact with the contact of the movable contact piece 13. This forms a first change-over switch 49 (instead of the above-described first switch 12). Similarly, a stationary contact piece 50 is arranged above the movable contact piece 16 in such a manner that its contact is in contact with the contact of the movable contact piece 16. This forms a second change-over switch 51 (instead of the above-described second switch 15).

Figure 17:
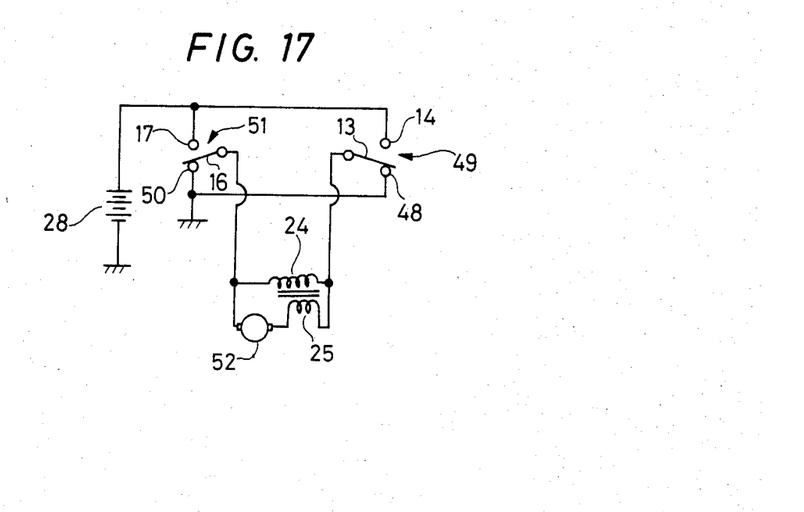
FIG. 17 is a circuit diagram of an electrical circuit employed in the switch of FIGS. 13-16.

As shown in FIG. 17, the stationary contact pieces 14 and 17 of the change-over switches 49 and 51 are connected to the positive terminal of the battery 28, and the remaining stationary contact pieces 48 and 50 are grounded. The series circuit of the current coil and a two-brush type motor 52 (instead of the above-described motor 27) is connected between the movable contact pieces 13 and 16, and the voltage coil 24 is connected in parallel to the series circuit.

Figure 15:
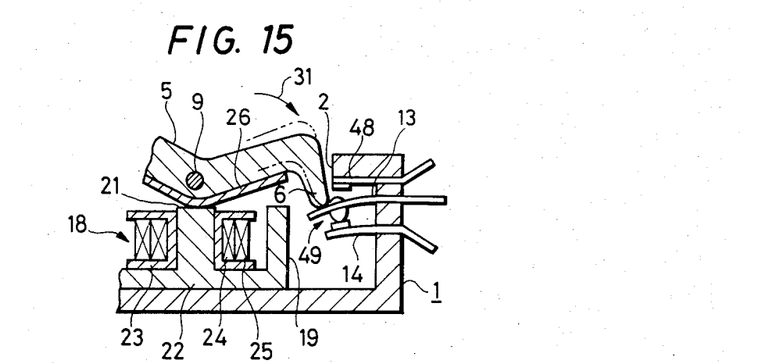
Figure 16:
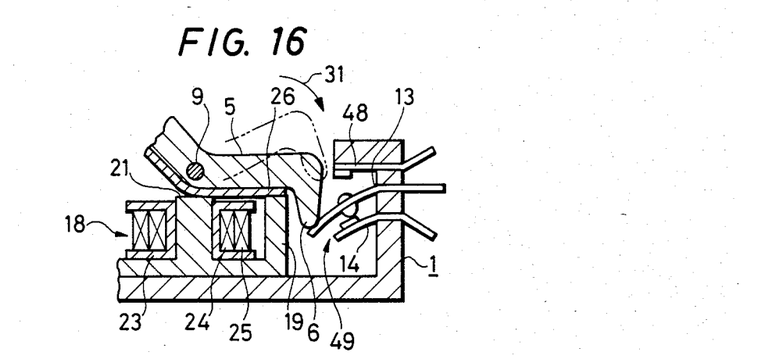

When the knob 5 is turned in the direction of the arrow 31 to take the first or second operating position for the opening operation, the movable contact piece 13 of the change-over switch 49 (corresponding to the above-described first switch 12) is brought into contact with the stationary contact piece 14 (as shown in FIG. 15 or 16). The supply voltage is applied to the series circuit of the current coil 25 and the motor 52 and to the voltage coil 24. As a result, current flows in the motor in one direction to rotate the motor 52 in the forward direction.

On the other hand, when the knob 5 is turned in the direction opposite to the direction of the arrow 31 to take the first or second operating position for the closing operation, the movable contact piece 16 of the second change-over switch 51 (corresponding to the above-described second switch 15) is brought into contact with the stationary contact piece 17. The supply voltage is applied to the series circuit of the motor 52 and the current coil 25 and to the voltage coil 24. As a result, current flows in the opposite direction to rotate the motor 52 in the reverse direction.

Accordingly, the fourth embodiment also has substantially the same effects as the first embodiment described above.

Figure 18:
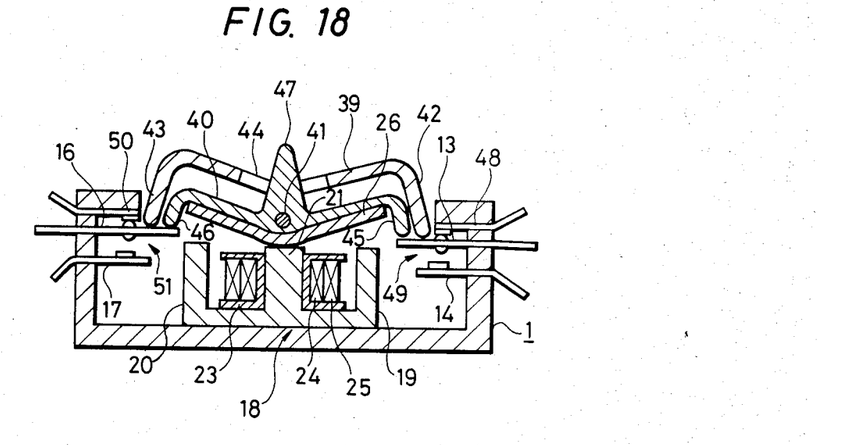
FIG. 18 is a sectional view of a fourth embodiment of the switch of the present invention.

A fifth embodiment of the invention is as shown in FIG. 18. The fifth embodiment is obtained by combining the manual knob 39 and the automatic knob 40 in the third embodiment with the first and second change-over switches 49 and 51 in the fourth embodiment, and its electrical circuit is as shown in FIG. 17. Therefore, the fifth embodiment has substantially the same effects as the third embodiment.

Several embodiments of the invention have been described with reference to the case where the technical concept of the invention is applied to a power window regulator switch device. The invention, however, is not limited thereto or thereby. That is, the technical concept of the invention is applicable to all motor controlling switch devices including power sun roof switch devices and power curtain switch device 5. The switch device may be so designed that the knob 5 is moved from the original position directly to the second operating position, or the manual knob 39 may be eliminated.

While the salient features of the invention have been described in connection with the preferred embodiments and the drawings, it will be obvious to those skilled in the art that various changes and modifications may be made without departing from the spirit and scope of the invention as set forth in the following claims.

What is claimed is:

1. A switch device for controlling an electric motor comprising:
   an operating member for taking an original position and an operating position for enabling a supply voltage to be applied to the motor;
   means for applying a restoring force to said operating member when said operating member is in said operating position to urge said operating member to move from said operating position to said original position; and
   an electromagnetic device for receiving said supply voltage and for producing a first magnetic force stronger than said restoring force to attract and to hold said operating member in said operating position, said electromagnetic device also for receiving current flowing in said motor and for producing a second magnetic force equal in strength to said first magnetic force in response to a predetermined condition of the motor, said second magnetic force controlling said first magnetic force to enable said restoring force to restore said operating member to said original position responsive to the occurrence of the predetermined condition of the motor.

2. A switch device according to claim 1 wherein said operating member comprises:
   a casing;
   a switch member secured in said casing and having a first end and a second end, said switch member being rotatable to said operating position in a first direction and a second direction;
   a first normally-open contact pair proximate said first end of said switch member, said first contact pair having closed upon rotation of said switch member in said first direction to said operating position to enable the supply voltage to be applied to the motor to rotate the motor in a first direction;
   a second normally-open contact pair proximate said first end of said switch member, said second contact pair being closed upon rotation of said switch member in said second direction to said operating position to enable the supply voltage to be applied to the motor to rotate the motor in a second direction; and
   a metallic plate attached to the underside of said switch member.

3. A switch device according to claim 1 wherein said operating member comprises:
   a casing;
   a first switch member secured in said casing and having a first end and a second end, said first switch member being rotatable to said operating position in a first direction and returning to said original position in response to second direction of said rotating force wherein said first switch member is not being actuated;
   a second switch member secured in said casing beneath said first switch member and having a first end and a second end, said second switch member being rotatable to said operating position in a first direction and a second direction;
   a first normally-open contact pair proximate said first end of said first switch member and said second switch member, said first contact pair being closed upon rotation of said first switch member on said second switch member in said first direction to said operating position to enable the supply voltage to be applied to the motor to rotate the motor in a first direction;
   a second normally-open contact pair proximate said second end of said first switch member and said second switch member, said second contact pair being closed upon rotation of said first switch member or said second switch member in said second direction to said operating position to enable the supply voltage to be applied to the motor to rotate the motor in a second direction; and
   a metallic plate attached to the underside of said second switch member.

4. A switch device according to claim 1 further including a casing for rotatably supporting said operating member and wherein said applying means comprises:
- a cylindrical protrusion extending downwardly from said operating member;
- a coil spring fitted within said cylindrical protrusion;
- a depressing piece having a first end received in said cylindrical protrusion and a second end, said depressing piece being spring-loaded by said spring; and
- a substantially V-shaped supporting recess on said casing for contacting said second end of said depressing piece and for biasing said depressing piece as said operating member means to said operating position to compress said spring to generate said rotating force.

5. A switch device according to claim 2 wherein said applying means comprises:
- a cylindrical protrusion extending downwardly from said switch member;
- a coil spring fitted within said cylindrical protrusion;
- a depressing piece having a first end received in said cylindrical protrusion and a second end, said depressing piece being spring-loaded by said spring; and
- a substantially V-shaped supporting recess on said casing for contacting said second end of said depressing piece and for biasing said depressing piece as said switch member is depressed to said operating position to compress said spring to generate said rotating force.

6. A switch device according to claim 3 wherein said applying means comprises:
- a cylindrical protrusion extending downwardly from said second switch member;
- a coil spring fitted within said cylindrical protrusion;
- a depressing piece having a first end received in said cylindrical protrusion and second end, said depressing piece being spring-loaded by said spring; and
- a substantially V-shaped supporting recess on said casing for contacting said second end of said depressing piece and for biasing said depressing piece as said second switch member is depressed to said operating position to compress said spring to generate said rotating force.

7. A switch device according to claim 1 wherein said electromagnetic device comprises:
- a voltage coil for receiving said supply voltage when said operating member is in said operating position and for producing said first magnetic force; and
- a current coil for receiving current flowing in said motor and for generating said second magnetic force.

8. A switch device according to any one of claims 2 through 6 wherein said electromagnetic device comprises:
- a voltage coil for receiving said supply voltage when said operating member is in said operating position and for producing said first magnetic force for acting upon said metallic plate; and
- a current coil for receiving current flowing in said motor and for generating said second magnetic force.

* * * * *